United States Patent Office 3,561,919
Patented Feb. 9, 1971

3,561,919
IRON OXIDE-FERRITE PRODUCTION PROCESS
Joseph W. Ayers, Easton, Pa. (% Chas. Pfizer & Co., Inc., 235 E. 42nd St., New York, N.Y. 10017)
No Drawing. Continuation-in-part of application Ser. No. 691,714, Dec. 19, 1967, which is a continuation-in-part of application Ser. No. 420,679, Nov. 23, 1964. This application June 13, 1969, Ser. No. 833,151
Int. Cl. C01g 49/00, 49/02
U.S. Cl. 23—51                                   7 Claims

ABSTRACT OF THE DISCLOSURE

Process for the preparation of soft and hard ferrites from synthetic non-magnetic iron oxide. Process for manufacturing ferrites, of low silica content directly from this iron oxide scale without resort to purification steps to remove silica from the iron source material. Scale is calcined in the presence of ferrous sulfate heptahydrate or sulfuric acid or a combination of both; the synthetic non-magnetic iron oxide product is then milled to the desired fineness, combined with other ferrite ingredients and formed into ferrites. Synthetic ion oxide product also suitable for use in rouges.

CROSS REFERENCE TO RELATED APPLICATIONS

This application is a continuation-in-part of my copending application, Ser. No. 691,714 filed on Dec. 19, 1967, which is a continuation-in-part of my application, Ser. No. 420,679, filed on Dec. 23, 1964, now abandoned.

BACKGROUND OF THE INVENTION

This invention relates to a process for the preparation of magnetic ferrites. More particularly it relates to the preparation of a synthetic non-magnetic iron oxide, suitable for rouge and ferrite applications, from mill scales and to processes for producing hard and soft ferrites from the mill scales, via the synthetic iron oxides.

The production of ferrites, particularly soft ferrites, requires the use of ferric oxide of extremely low silica content. These, relatively silica-free ferric oxides, must be produced by chemical precipitation from soluble iron salts or by initial purification of other forms of ferric material to remove the silica. Manufacture of synthetic ferric oxide by precipitation or preliminary purification is expensive and often difficult. The processes of this invention provide a relatively silica-free synthetic non-magnetic ferric oxide in an inexpensive manner. The economic value of the novel process derives from the fact that the mill scale, which is used in the process, may be obtained in a low silica form and the iron oxide which is produced from this mill scale is relatively uncontaminated with silica and is, consequently, eminently suitable for the production of soft ferrites.

Rouges, which are prepared from synthetic iron oxides, have heretofore been manufactured from natural iron ores or formed in a two-step calcination process from copperas or prepared from iron compounds formed by chemical precipitation from soluble iron salts.

The use of natural iron ores, without further treatment except grinding, as rouges, is disadvantageous inasmuch as only a limited number of iron ores are suitable for rouge preparation and as it is difficult to obtain a uniform product because of the natural differences in iron ores mined at different locations and at different levels at the same location. The synthetic iron oxides produced by the novel processes of this invention overcome these disadvantages inasmuch as the mill scale row material is abundantly available and relatively inexpensive and as the composition of the synthetic iron oxide product may be controlled by adjusting the composition of the initial material charged to the process.

The production of rouges from iron compounds formed by chemical precipitation from soluble iron salts is disadvantageously expensive and the novel processes of this invention, which employed inexpensive raw materials, are economically superior to precipitation methods for producing rouges.

The production of synthetic iron oxides from copperas involves a two-step process wherein the $FeSO_2 \cdot 7H_2O$ is first converted to the monohydrate and the resulting monohydrate is calcined to ferric oxide for use in rouges. The two-step process is necessary because direct calcination of the heptahydrate causes the compound to melt and form an unworkable cement-like mass which is very difficult to process and grind. The processes of this invention allow the heptahydrate to be used directly, in a one-step process, together with the mill scale, to produce the ferric oxide in an easily handled, grindable form.

SUMMARY OF THE INVENTION

This invention relates to a process for the preparation of magnetic ferrites from synthetic non-magnetic iron oxides derived from iron oxide mill scales.

The process comprises forming a blended mix of iron oxide scale with ferrous sulfate heptahydrate or with concentrated sulfuric acid and water, in admixture. The blended mix may also be formed of the scale and ferrous sulfate, sulfuric acid and water, all together. Where ferrous sulfate is used as the reagent, the weight ratio of scale to ferrous sulfate heptahydrate is about 0.5 to about 2.0 parts of scale per part of ferrous sulfate heytahydrate. Where sulfuric acid and water in admixture are used, the water is present in an amount equal to at least 10% by weight of the iron oxide scale and the acid is present in an amount equal to from 5 to 100% by weight of the mix. The blended mix is calcined at a temperature from 1000° F. to 2000° F. for at least ¼ hour and is subsequently milled. Where both sulfuric acid and ferrous sulfate are used, the mix may be prepared by treating the ferrous sulfate with sulphuric acid before the addition of the mill scale. A preferred form of mill scale is that where 99% of the scale has a particle size finer than 325 mesh. A preferred temperature range for the calcining step is 1300° F. to 1600° F. Preferred operating conditions with sulfuric acid and water are those where the water is present in a weight of at least 20% of the weight of iron oxide mill scale and the acid is present in an amount, by weight, from 10 to 50% of the mixture. The calcined product is combined with other ferrite components, the combined mixture is compressed into a shaped ferrite, the compressed shaped mixture is sintered and then cooled.

Preferred iron oxide scales, for use in the manufacture of soft ferrites, contain 0.25%, by weight, of silica, or less.

The ferrite production process may also include a step in which the combined ferrite ingredients are calcined prior to compression into a shaped ferrite.

DETAILED DESCRIPTION OF THE INVENTION

The herein disclosed process for preparing the synthetic non-magnetic iron oxide comprises calcining a blended mix of iron oxide scale and ferrous sulfate heptahydrate, weight ratio of said reactants being from about 0.5 to about 2 parts of said mill scale per part of said hydrate, at a temperature from about 1000 to about 2000 F. until substantial calcination has occurred and subsequently milling said calcined product.

By the term "iron oxide scale" is meant any iron oxide scale which is derived from steel milling operations. For instance, the following are examples of iron oxide scale suitable for the above described process; Blooming Mill Scale, Rolling Mill Scale, Scarfing Scale, Finishing Mill Scale, Straight Mill Scale, etc.

The composition of the mill scales which are useful in the process of this invention may vary widely. The actual initial comosposition of the scale is determined by the type of steel, under production, from which the mill scale is obtained and by the subsequent handling which the mill scale receives after removal from the steel production process. As a general matter, any mill scale may be used which does not contain elements which are harmful to the product for which the synthetic iron oxide is intended. In the case of a rouge, which is to be produced from the synthetic iron oxide, the mill scale should not contain any ingredients which are harmful to the usefulness of the rouge.

Where the mill scale is to be used for the production of ferrites, particularly soft ferrites, special attention must be paid to the silica content of the initial mill scale. In the case of soft ferrites, it is known to those skilled in the art that the performance of a soft ferrite improves with the lowering of the silica content. Silica contents as low as 0.05% are especially useful in the final synthetic iron oxides which are used in the soft ferrites. For this reason, mill scales for the production of iron oxide which is to be used for soft ferrites, preferably, should have a maximum silica content of about 0.25% although mill scales with higher silica contents may be used. Where mill scales with higher silica contents are used, the resultant synthetic iron oxide, used in the soft ferrites, may have a satisfactory silica content due to the presence of the additional iron added in the ferrous sulfate heptahydrate. This additional iron will dilute the silica content of the initial mill scale down to an acceptable value.

In the case of hard ferrites, mill scales with higher silica contents are useful, if not desirable, and mill scales with appropriately higher silica contents, ranging up to 0.5% by weight, are preferable for the production of synthetic iron oxides to be used in hard ferrites. The observations, made above, with respect to the dilution effect, on excess silica, of the iron added with the ferrous sulfate heptahydrate are also applicable here. Consequently, mill scales with silica contents somewhat higher than 0.5% may be used for producing hard ferrites.

It has been found in general that the finer in texture the scale, the more desirable it is with respect to said process. Said desirability is based on the ability of the finer scale to provide a more intimate mix due to its increased surface area which results in an overall enhancement of the rate of reaction. Further, the conversion of mill scale to iron oxide suitable for rouge and ferrite applications by our process is directly related to the following interdependent variable; fineness of mill scale, calcination time, and temperature. For instance, for mill scale of any given particle size, the calcining period and reaction temperature are related in the following manner; if the reaction temperature is held constant, the calcining period required to produce a suitable synthetic iron oxide decreases as the particle size of the said mill scale decreases. Therefore, when a fine mill scale is employed, less calcination time or lower reaction temperatures are required to prepare a suitable synthetic iron oxide. It is not intended to imply that a rough-textured mill scale is not suitable; however, the final product obtained when a rough-textured mill scale is utilized is darker in color and harder to grind, i.e., requires a more severe milling operation. The latter side-effects arise as a direct result of longer calcination periods or higher reaction temperatures which enable crystal growth to take place causing larger particles to form which are darker in color and harder to grind. Most particularly preferred is a mill scale in which at least 99% of said mill scale has a particle size finer than 325 mesh.

In this connection, the reaction temperature also plays an important role. It is possible to carry out the above reaction at a temperature from about 1000 to about 2000° F. but more particularly preferred is a reaction temperature of about 1500° F. Generally, the higher the reaction temperature, the shorter the calcining period, i.e., effective calcination will take place in less time when said calcination step is conducted at higher temperatures. However, when the reaction is performed at higher temperatures, the roaster product although lower in FeO content, is darker in color and harder to grind. To minimize the latter side-effects, an intermediate temperature range, for example, from about 1300 to about 1600° F., is best suited.

The weight ratio of mill scale to ferrous sulfate heptahydrate can vary from 1:2 to 2:1, however, it has been found that the most desirable is a weight ratio of about 1:1.

The preferred procedure for preparing the mix of iron oxide and ferrous sulfate heptahydrate comprises combining said reagents simultaneously and mixing in a suitable blender, for example, a ribbon blender at room temperature until a sufficiently intimate mix is obtained. Still another suitable procedure consists of heating said sulfate above 150° F. while stirring and subsequently adding the iron mill scale gradually to insure good mixing. On continued mixing, the latter procedure results in the formation of a pelletized intimate mix of said reagents which is highly suitable for direct calcination.

In addition to the general method outlined above, we have discovered two further variations which are equally successful for the preparation of iron oxide suitable for rouge and ferrite applications. The first is a modification of the earlier described process which consists of treating ferrous sulfate heptahydrate with at least 10% by weight of concentrated sulfuric acid followed by the addition of iron oxide scale. Less than 10% will result in poor mixing and is therefore unsatisfactory. The same conditions apply here as those hereinbefore disclosed. One specific advantage is that the synthetic iron oxide so obtained is finer in texture thereby permitting the milling step to be less tedious and time consuming. Another advantage of this modification is that it allows the calcination time to be reduced without affecting the nature or yield of product. Furthermore, as the mixing reaction proceeds, the mix dries preferentially to a pellet form. Said form is the one of choice for feed material since it is less susceptible to temperature fluctuation and less subject to stack losses resulting from draft conditions for oxidation and to carry off the evolved gases.

The second variation is characterized by the omission of ferrous sulfate heptahydrate from the reaction mixture. It consists of calcining a blended mix of iron oxide scale, water, and concentrated sulfuric acid, said water present in an amount to provide at least 10% by weight of said iron oxide, and said acid present in an amount to provide from about 5% to about 100% by weight of said mix, at a temperature from about 1000 to about 2000° F. until substantial calcination has occurred and subsequently milling said calcined product. Conditions more particularly preferred are those wherein said water is present in an amount to provide 20% by weight of said iron oxide, said acid is present in an amount to provide about 50% by weight of mix, and said reaction temperature is from about 1300° F. to about 1600° F. The preferred mode of addition consists of adding the water to the iron oxide scale while stirring in a suitable mixer followed by the addition of concentrated sulfuric acid.

The crude iron oxide obtained from any of the herein described methods is converted to a finely powdered product by one of many possible milling processes whereof said product is held on a 325 mesh screen. In order to pass through a 325 mesh screen, a particle must be less than approximately 45 microns in size. The range of said particle size generally varies from about ¼ micron to about 45 microns. Particularly preferred is a distribution wherein the majority of particles possess a particle size less than 25 microns. For this reason, a ball milling operation may be added to provide a finer product with a greater distribution of smaller particle size, i.e., from about ¼ micron to about 25 microns.

It has been shown that the non-magnetic iron oxide prepared from mill scale by any of the processes disclosed in this invention is characterized by a reproducible composition of matter. The desired product will assay from about 97 to about 99.9% by weight of $Fe_2O_3$, having an FeO content of from 0.01 to about 3% by weight and a soluble salt content from about 0.1 to about 2% by weight. Most preferred is a product having a maximal weight percent of $Fe_2O_3$, i.e., about 99%, a minimal FeO content, i.e., less than 1%, and a soluble salt figure of less than 0.25%. The above said desired product can be derived by analyzing the discharged material at frequent intervals at fixed reaction temperatures.

Where the iron oxide product of the processes of this invention is to be used in the production of ferrites, the silica content of the iron oxide should be appropriate for the type of ferrite to be manufactured. As has been stated above, the lower limit of the silica content of the iron oxide product of the processes of this invention is set by the initial mill scale used. For the production of soft ferrites, the silica content of the iron oxide product should be 0.25% by weight, or less. For the production of hard ferrites, the silica content of the iron oxide product may be higher, ranging up to one or more percent, or more, but should preferably be 0.5%, by weight, or less.

Evaluation of samples prepared from mill scale for rough properties is achieved by a series of tests. In general, an acceptable rough will fall in the range of values tabuated beow:

Reguar abrasive power _____ 60–80
High pressure abrasive power _____ 160–220
6.0° Be. pate gass test _____ 1.10–1.25

The abrasive power test is conducted in the following manner: A slurry of 100 ml. of water and 50 g. of test material is fed to an American Optical Bowl Polisher (M–22) for 10 min. at 10 sec. intervals. The lens is weighed before and after the polishing period. The loss in weight is recorded in mg. Various pressures can be established by changing the amount of weight on the spindle from which the lens rotates. A regular A.P. Test will have approximately 3.5 lbs./in.$^2$ pressure on the lens. A high pressure A.P. Test will have approximately 10.0 lbs./in.$^2$ pressure on the lens.

The 6.0° Be. plate glass test comprises feeding a rouge slurry on to a rotating piece of plate glass, which is polished by a hard wood felt lap. The rouge slurry usually consists of the following:

Rouge: 50 g.
Ferrous sulfate heptahydrate: 20 g.
Water: 1000 ml.

This slurry is metered through a pumping system to feed at the rate of 10 ml./min. The wool lap is mounted to a metal holder which is allowed to rotate freely by the motion of the glass beneath it. The glass is mounted on a rotating table which can be heated to various temperatures. The usual setting gives a plate temperature of 120° F.

Removal rates are determined by the recorded loss of weight of the glass specimen for a given time and is usually recorder as g./hr. or mg./hr.

The single most important factor in evaluating a rouge is believed to be the 6.0 Be. plate test. A value of 1.20 or To evaluate the non-magnetic iron oxide prepared by the process of this invention in ferrite applications, the magnetic properties of three typical formulations incorporating the aforesaid iron oxide are measured wherein general methods well known to those skilled in the art were followed.

For the manufacture of soft ferrites, that is ferrites which are magnetized only when an electric field exists around them, it is accepted that the initial permeability $[\mu^o]$ and the quality factor, Q, are useful criteria in evaluating the final ferrites. Both $\mu^o$ and Q are known to vary widely with composition, the sintering temperatures used, the atmosphere used during sintering and the cooling rates after sintering. For a soft ferrite, useful as a television picture tube yoke, produced by the one-step process exemplified below, and consisting of $Fe_2O_3$, ZnO, NiO and CuO, values of Q of 75 to 100 and of $\mu^o$ of 600 to 1000 are acceptable. For a soft ferrite, useful as a transformer core, produced by the two-step process exemplified below, and consisting of $Fe_2O_3$, ZnO and MnO, an acceptable value for the $\mu^o$ Q Product is 100,000.

For hard ferrites, that is ferrites which are permanent magnets, it is acceptable that the maximum energy product and the residual flux density are useful criteria in evaluating the final ferrites. For hard ferrites, produced by the two-step process exemplified below, and consisting of $Fe_2O_3$ barium carbonate, the maximum energy product should be at least $1.0 \times 10^6$ and the value of the residual flux density should be from 2400 to 2500.

In the processes of this invention, soft and hard ferrites are produced using the non-magnetic iron oxide ($Fe_2O_3$) reaction product of the iron oxide scale, ferrous sulfate heptahydrate and/or sulfuric acid reaction. The ion oxide reaction product, prepared from the iron oxide scale, in the novel processes disclosed above, is mixed with other ferrite ingredients and compressed to form the ferrites.

Two separate procedures are used to produce the ferrites in the processes of this invention. These procedures, which involve either one or two heating steps for the combined oxide mixture, are exemplified below and have been used to evaluate the ferrites produced in the processes of this invention.

In the one-step procedure, the synthetic iron oxide reaction product, derived from the iron oxide mill scale, is mixed with other ferrite ingredients, such as other metal oxides, in a wet ball mill or other mixing device. A small amount of binder material may also be added. The mixture is dewatered, dried, sieved and pressed into the required physical forms. The compressed forms are then sintered, in appropriate atmospheres, and cooled, slowly or by quenching to form the finished ferrites.

In the two-step procedure, the synthetic iron oxide reaction product, derived from the mill scale, is mixed with other ferrite ingredients in a wet ball mill or a similar mixing device. The mixed product is then dried and calcined. The calcined mixture is wet ball-milled or similarly ground and mixed again and a binder may be added at the end of this mixing period. The product from this operation is dewatered, dried, sieved and pressed into the required physical forms. The compressed forms are then sintered, in appropriate atmospheres, and cooled, slowly or by quenching to produce the final ferrites.

Ferrites may also be prepared, using other procedures which are well known to those skilled in the art, from the synthetic iron oxides produced by processes of this invention without departing from the scope of this invention.

It is among the objects of this invention therefore to prepare a suitable synthetic rouge from mill scale. Another object is to prepare an iron oxide suitable in ferrite applications.

The following examples are provided by way of illustration and should not be interpreted as limiting the invention, many variations of which are possible without de-

EXAMPLE I

A blended mix of iron oxide scale (500 g.) and ferrous sulfate heptahydrate (500 g.) is prepared by stirring said reactants in a Hobart Mixer and subsequently charging to a rotary kiln. The kiln temperature is brought to 1350° F. and held there for ½ hour. The powdered non-magnetic iron oxide product is then collected. Yields of approximately 90% of theory are obtained.

EXAMPLE II

The procedure of Example I is repeated wherein 99%, of said mill scale has a particle size finer than 325 mesh and substantially the same results are obtained.

EXAMPLE III

The procedure of Example I is repeated except for the variations noted below and substantially the same results are obtained:

| Weight ratio | | |
|---|---|---|
| Mill scale | Ferrous sulfate heptahydrate | Temp., ° F. |
| 1 | 2 | 1,300 |
| 2 | 1 | 1,600 |

EXAMPLE IV

The procedure of Example I is repeated wherein said product is ball-milled until less than 0.1% is held on a 325 mesh screen. This product is analyzed for $Fe_2O_3$, and soluble salts and the following results are obtained:

|  | Percent |
|---|---|
| $Fe_2O_3$ | 99.0 |
| FeO | 0.8 |
| Soluble salts | 0.2 |

EXAMPLE V

Concentrated sulfuric acid (10 g.) is added to ferrous sulfate heptahydrate (100 g.) and a reaction takes place as evidenced by a color change. Ground mill scale (100 g.) is then added and the mix is stirred and fired to 1600° F. for 20 minutes. The resulting product is collected and weighed. Yields of approximately 90% of theory are obtained.

EXAMPLE VI

A blended mix of iron oxide scale (500 g.), water (100 g.), and concentrated sulfuric acid (250 g.) is prepared in the following manner: the water is added to the iron oxide scale while stirring in a Hobart Mixer followed by the addition of concentrated sulfuric acid. The resulting pelletized mixture is subsequently charged to a rotary kiln. The kiln temperature is brought to 1500° F. and held there for ½ hour. The powdered product is then collected. Yields of approximately 90% of theory are obtained.

EXAMPLE VII

The product from Example I is evaluated as a rouge and the following results are obtained:

|  |  |
|---|---|
| Regular abrasive power | 70.7 |
| High pressure power | 199.4 |
| 6.0° Be. plate glass test | 1.20 |

The above results indicate the exceptional merit of said rouge made from mill scale.

EXAMPLE VIII

The product obtained by the method described in Example I is used to prepare a soft ferrite body of the following composition:

|  | Mole percent |
|---|---|
| $Fe_2O_3$ | 48 |
| ZnO | 30 |
| NiO | 18 |
| CuO | 4 |

The above oxides are mixed by wet ball milling for 2 hours. After 1½ hours of said time period, a small quantity of a water-wax emulsion is added as a binder material. The resulting mixture is dewatered, oven dried, and made to pass through a 30 mesh sieve. Twelve grams of powder are used to press toroids of about 3.84 cm. outside diameter, 2.54 cm. inside diameter and 0.630 cm. high. The magnetic properties at 100 kilocycles on a core sintered for 6 hours at a temperature of 2300° F. are: initial permeability $[\mu_o]$ equal to 656 and the quality factor Q equal to 81.4.

EXAMPLE IX

Iron oxide prepared as in Example I is used in formulating a soft magnetic core of manganese zinc ferrite of the following composition:

|  | Mole percent |
|---|---|
| $Fe_2O_3$ | 53.1 |
| ZnO | 12.8 |
| MnO | 34.1 |

The above composition is prepared following the procedure outlined in Example VIII. Toroidal specimens are compacted using 13 grams of the granulated product. The toroid dimensions are: outside diameter 3.23 cm.; inside diameter 2.54 cm.; and 0.65 cm. high. A core is sintered for 2 hours at a temperature of 2500° F. in a nitrogen atmosphere containing less than 1% oxygen. The magnetic properties measured at a frequency of 100 kilocycles are initial permeability $[\mu_q]$ equal to 1140 and the quality factor Q equal to 92.4.

EXAMPLE X

Iron oxide prepared by the method outlined in Example I is used to prepare a barium ferrite magnet having the following composition:

|  | Mole percent |
|---|---|
| $Fe_2O_3$ | 81.5 |
| Barium carbonate | 18.5 | wherein said composition is prepared following the procedure outlined in Example VIII. Twenty grams of powdered composition are used to press cylindrical specimens of approximately 2.55 cm. in diameter and 12.27 cm. in height.

The compacted samples are sintered at a temperature of 2300° F. for one hour. Magnetic properties determined on a typical magnet are 1920 oersteds coercive force, 2470 gauss residual flux density and a maximum energy product of $1.25 \times 10^6$ gauss oersteds.

EXAMPLE XI

A blended mix of iron oxide mill scale (500 g.) and ferrous sulfate heptahydrate (500 g.) was prepared by stirring the reactants in a Hobart Mixer and subsequently charging to a rotary kiln. The kiln temperature was brought to 1350° F. and held there for ½ hour. The powdered product was then collected. Yields of approximately 90% of theory were obtained.

The product was ball milled until less than 0.1% was held on a 325 mesh screen and substantially all the material was of a particle size of 10 microns or less. The product was analyzed and the following results were obtained:

|  | Percent |
|---|---|
| $Fe_2O_3$ | 98.9 |
| FeO | 0.7 |
| $SiO_2$ | 0.2 |
| Soluble salts | 0.2 |

This synthetic non-magnetic iron oxide material was used to prepare soft ferrite bodies consisting of:

|  | Mol percent |
|---|---|
| $Fe_2O_3$ | 48 |
| ZnO | 30 |
| NiO | 18 |
| CuO | 4 |

The oxides were mixed, by wet ball milling, for two hours. After one and half hours, a small quantity of a water-wax emulsion was added as a binder material. The water slurry was dewatered and oven dried. The dried mixture was broken down to pass through a 30 mesh sieve. Twelve grams of powder were used to press toroids of about 3.84 cm. O.D., 2.54 cm. I.D. and .630 cm. high. The toroids were pressed to a density of about 3 gms. per cubic centimeter.

The toroidal cores were sintered for six hours, in an atmosphere of nitrogen with 0.75% oxygen, at a temperature of 2300° F. and were cooled at a rate of 450° F. per hour. The magnetic properties measured at 100 kilocycles were initial permeability $[\mu°]$ equal to 656 and Q equal to 81.4.

This example illustrates the procedures by which a soft ferrite, manifesting excellent magnetic properties, may be prepared directly from mill scale without the necessity for removing silica from the iron source material.

EXAMPLE XII

A blended mix of iron oxide mill scale (500 g.) and ferrous sulfate heptahydrate (500 g.) was prepared by stirring the reactants in a Hobart Mixer and subsequently charging to a rotary kiln. The kiln temperature was brought to 1350° F. and held there for ½ hour. The powdered non-magnetic iron oxide product was then collected. Yields of approximately 90% of theory were obtained.

The product was ball milled until less than 0.1% was held on a 325 mesh screen and more than 95% of the material was of a particle size of 10 microns or less. The product was analyzed and the following results were obtained:

|  | Percent |
|---|---|
| $Fe_2O_3$ | 98.9 |
| FeO | 0.7 |
| $SiO_2$ | 0.2 |
| Soluble salts | 0.2 |

The synthetic iron oxide material was used to prepare soft magnetic cores of manganese zinc ferrite. The composition was about 53.1 mol percent $Fe_2O_3$, 12.8 mol percent ZnO and 34.1 mol percent MnO.

The oxides were ball milled together with water for four hours. The resultant slurry was dewatered and dried. The dried oxide mixture was granulated to —20 mesh size and calcined in a muffle furnace for two hours in an air atmosphere at a temperature of 2225° F. The calcined product was then wet ball milled for eight hours. After seven and a half hours a quantity of water-wax emulsion was added as a binding agent. This slurry was dewatered, dried and granulated through a 30 mesh sieve.

Toroidal specimens were compacted using thirteen grams of the granulated product. The toroid dimensions were 3.23 cm. O.D., 2.54 cm. I.D. and .65 cm. high and a density of about 3 gms. per cubic centimeter was used.

The cores were sintered for two hours at a temperature of 2500° F. in a nitrogen atmosphere containing less than one percent oxygen and cooled at a rate of 450° F. per hour. The magnetic properties, measured at a frequency of 100 kilocycles, were initial permeability $[\mu_o]$ equal to 1140 and Q equal to 924.

EXAMPLE XIII

A blended mix of iron oxide mill scale (500 g.) and ferrous sulfate heptahydrate (500 g.) was prepared by stirring the reactants in a Hobart Mixer and subsequently charging to a rotary kiln. The kiln temperature was brought to 1350° F. and held there for ½ hour. The powdered product was then collected. Yields of approximately 90% of theory were obtained.

The product was ball milled until less than 0.1% was held on a 325 mesh screen and more than 95% of the material was of a particle size of 10 microns or less. The product was analyzed and the following results were obtained:

|  | Percent |
|---|---|
| $Fe_2O_3$ | 98.9 |
| FeO | 0.7 |
| $SiO_2$ | 0.2 |
| Soluble salts | 0.2 |

This synthetic iron oxide material was used to prepare barium ferrite magnets by mixing 81.5% by weight of the iron oxide with 18.5% of barium carbonate. The initial mixing was accomplished by wet ball milling for a period of four hours. The slurry was dewatered, dried and granulated through a 20 mesh sieve. The granulated material was calcined in a muffle furnace for four hours at a temperature of 2100° F. The calcined product was wet ball milled for twenty-four hours. After twenty-three and a half hours a small quantity of a water-wax emulsion was added as a binding agent. The slurry from the mill was dewatered and dried. The dried material was granulated through a 30 mesh sieve and twenty grams of the powder were used to press cylindrical specimens of approximately 2.55 cm. in diameter and 1.27 cm. in height.

The compacted samples were sintered at a temperature of 2300° F. for one hour. Magnetic properties, determined on a typical magnet, were 1920 oersteds coercive force, 2470 gauss residual flux density and a maximum energy product of $1.25 \times 10^6$ gauss oersteds.

EXAMPLE XIV

When the procedures of Example XI are carried out, except that the procedures of Example V are used to prepare the synthetic non-magnetic iron oxide material from the mill scale, results substantially identical to those found in Example XI are obtained.

EXAMPLE XV

When the procedures of Example XII are carried out, except that the procedures of Example V are used to prepare the synthetic non-magnetic iron oxide material from the mill scale, results substantially identical to those found in Example XII are obtained.

EXAMPLE XVI

When the procedures of Example XIII are carried out, except that the procedures of Example V are used to prepare the synthetic non-magnetic iron oxide material from the mill scale, results substantially identical to those found in Example XIII are obtained.

EXAMPLE XVII

When the procedures of Example XI are carried out, except that the procedures of Example VI are used to prepare the synthetic non-magnetic iron oxide material from the mille scale, results substantially identical to those found in Example XI are obtained.

EXAMPLE XVIII

When the procedures of Example XII are carried out, except that the procedures of Example VI are used to prepare the synthetic non-magnetic iron oxide material from the mill scale, results substantially identical to those found in Example XII are obtained.

EXAMPLE XIX

When the procedures of Example XIII are carried out, except that the procedures of Example VI are used to prepare the synthetic non-magnetic iron oxide material from the mill scale, results substantially identical to those found in Example XIII are obtained.

What is claimed is:
1. A process for the preparation of magnetic ferrites, which comprises calcining a blended mix of iron oxide scale, obtained from steel-milling operations and having a silica content up to about 0.5% by weight, in the presence of a reagent selected from the group consisting of:
  (a) ferrous sulfate heptahydrate, weight-ratio of the reactants being from about 0.5 to about 2 parts of said mill scale per part of said hydrate and
  (b) concentrated sulfuric acid and water in admixture, said water present in an amount to provide at least 10% by weight of said iron oxide, said acid present in an amount to provide from about 5% to about 100% by weight of said mix, at a temperature from about 1000° F. to about 2000° F. for at least ¼ hour, recovering the non-magnetic iron oxide thereby produced assaying from about 97 to about 99.9% by weight $Fe_2O_3$ with about 0.01 to about 3% by weight FeO and about 0.1 to about 2% by weight soluble salts, subsequently milling said product, combining said calcined and milled product with other ferrite components, compressing the resultant mixture into a shaped ferrite, sintering the compressed, shaped mixture and cooling said shaped mixture.

2. The process of claim 1 wherein the iron oxide scale contains a maximum of 0.25% silica, by weight.

3. A process for the preparation of non-magnetic iron oxide assaying from about 97 to about 99.9% by weight $Fe_2O_3$ with about 0.01 to about 3% by weight FeO and about 0.1 to about 2% by weight soluble salts, which comprises calcining a blended mix of iron oxide scale, obtained from steel-milling operations and having a silica content up to about 0.5% by weight, and ferrous sulfate heptahydrate, weight-ratio of the reactants being from about 0.5 to about 2 parts of said mill scale per part of said hydrate, at a temperature from about 1000 to about 2000° F. for at least ¼ hour.

4. A process for the preparation of non-magnetic iron oxide assaying from about 97 to about 99.9% by weight $Fe_2O_3$ with about 0.01 to about 3% by weight FeO and about 0.1 to about 2% by weight soluble salts, which comprises calcining a blended mix of iron oxide scale and ferrous sulfate heptahydrate, said scale being obtained from steel-milling operations and having a maximum silica content of 0.25%, by weight; 99% of said scale having a particle size finer than 325 mesh; said heptahydrate being treated with between about 10% and 100%, by weight, of concentrated sulfuric acid before the addition of said scale; the weight-ratio of the reactants being about one part of said scale per part of said hydrate; said calcination proceeding at a temperature from about 1300° F. to about 1600° F. for at least ¼ hour; and subsequently milling said calcined product.

5. A process for the preparation of non-magnetic iron oxide assaying from about 97 to about 99.9% by weight $Fe_2O_3$ with about 0.01 to about 3% by weight FeO and about 0.1 to about 2% by weight soluble salts, which comprises calcining a blended mix of iron oxide scale, obtained from steel-milling operations and having a silica content up to about 0.5% by weight, water and concentrated sulfuric acid, said water being present in an amount to provide at least 10% by weight of said iron oxide, said acid being present in an amount to provide from about 5 to about 100% by weight of said mix, at a temperature from about 1000 to about 2000° F. until substantial calcination has occurred.

6. The process of claim 3 wherein the iron oxide scale contains a maximum of up to 0.25% silica, by weight.

7. The process of claim 5 wherein the iron oxide scale contains a maximum of up to 0.25% silica, by weight.

References Cited

UNITED STATES PATENTS

| 2,203,905 | 6/1940 | Heckman | 23—200X |
| 2,452,608 | 11/1948 | Smith | 23—200X |
| 2,766,211 | 10/1956 | Miller | 23—200X |
| 2,954,303 | 9/1960 | Westcott | 23—200X |
| 3,036,007 | 5/1962 | Buykx | 252—62.62 |

OTHER REFERENCES

Jacobson: "Encyclopedia of Chemical Reactions," vol. IX, 1951, Reinhold Pub. Corp., New York, p. 92.

HERBERT T. CARTER, Primary Examiner

U.S. Cl. X.R.

23—200; 252—62.56

PO-1050
(5/69)

UNITED STATES PATENT OFFICE
CERTIFICATE OF CORRECTION

Patent No. 3,561,919       Dated February 9, 19

Inventor(s) Joseph W. Ayers

It is certified that error appears in the above-identified p
and that said Letters Patent are hereby corrected as shown below:

In the heading above column 1, delete:

"(c/o Chas. Pfizer & Co., Inc., 235 E. 42nd St.,
New York, N. Y. 10017)"

and insert:

--assignor to Pfizer Inc., New York, N. Y., a
corporation of Delaware--.

Signed and sealed this 7th day of September 1971.

(SEAL)
Attest:

EDWARD M. FLETCHER, JR.
Attesting Officer

ROBERT GOTTSCHALK
Acting Commissioner c